United States Patent
Arney et al.

[11] Patent Number: 6,152,186
[45] Date of Patent: Nov. 28, 2000

[54] LIGHTWEIGHT HOSE WITH A HELICALLY-WOUND REINFORCING MEMBER AND METHOD FOR MAKING THE SAME

[75] Inventors: John W. Arney, Southern Pines, N.C.; Ralph L. Gooch, Plainwell; William R. Haywood, Hastings, both of Mich.

[73] Assignee: Flexfab Horizons International, Inc., Hastings, Mich.

[21] Appl. No.: 09/109,455

[22] Filed: Jul. 2, 1998

Related U.S. Application Data

[63] Continuation of application No. PCT/US97/00232, Jan. 2, 1997.
[60] Provisional application No. 60/009,556, Jan. 3, 1996.
[51] Int. Cl.[7] .................................................. F16L 11/08
[52] U.S. Cl. ..................... 138/129; 138/122; 138/133; 138/154
[58] Field of Search .................... 138/129, 122, 138/121, 132, 173, 174, 109, 154, 133

[56] References Cited

U.S. PATENT DOCUMENTS

| | | | |
|---|---|---|---|
| 3,706,326 | 12/1972 | Bringolf | 138/129 |
| 4,010,054 | 3/1977 | Bradt | 156/173 |
| 4,098,298 | 7/1978 | Vohrer | 138/122 |
| 4,104,097 | 8/1978 | Gregory et al. | 156/143 |
| 4,203,476 | 5/1980 | Vitellaro | 138/122 |
| 4,217,935 | 8/1980 | Grendelman et al. | 138/109 |
| 4,308,895 | 1/1982 | Greco | 138/125 |
| 4,452,280 | 6/1984 | Werner | 138/131 |
| 4,521,270 | 6/1985 | Lupke | 156/429 |
| 4,599,784 | 7/1986 | Canu, Jr. et al. | 138/122 X |
| 4,768,563 | 9/1988 | Kogge et al. | 138/109 |
| 4,796,672 | 1/1989 | Kanao | 138/154 |
| 5,062,457 | 11/1991 | Timmons | 138/125 |
| 5,143,122 | 9/1992 | Adkins | 138/109 |
| 5,305,799 | 4/1994 | Dal Palu | 138/109 |
| 5,526,849 | 6/1996 | Gray | 138/133 |
| 6,000,435 | 12/1999 | Patel et al. | 138/122 |

FOREIGN PATENT DOCUMENTS

| | | |
|---|---|---|
| 0 068 128 | 1/1983 | European Pat. Off. . |
| 0 523 360 | 1/1993 | European Pat. Off. . |
| 1 369 458 | 8/1964 | France . |
| 2 720 471 | 12/1995 | France . |
| 19 25 420 | 10/1965 | Germany . |
| 85 00 589 | 2/1985 | Germany . |
| 35 19 468 | 5/1986 | Germany . |

*Primary Examiner*—Patrick Brinson
*Attorney, Agent, or Firm*—Rader, Fishman, Grauer & McGarry, an office of Rader, Fishman & Grauer

[57] ABSTRACT

A lightweight hose (80) is disclosed which is formed from a heat seamable material and includes a helically-wound reinforcing member (88). The hose (80) can be formed in a short, definite length and a relatively long, indefinite length by a mandrel and a continuous process, respectively. In one aspect of the invention, a lightweight conduit (80) comprises a tubular wall (82) formed of at least one ply of heat seamable material and at least one helical member (88) whereby the at least one ply is bonded to itself and to the at least one reinforcing member (88) without additional adhesive. The invention also relates to lightweight conduits in the form of connectors such as cuffs (140) and T- and Y-connectors (170) and (180), respectively. The invention further relates to a method for forming a lightweight conduit, including but not limited to, the embodiments of a hose described herein. The method can be characterized by the steps of wrapping at least one ply of heat seamable material (134) around a mandrel (120) so that at least one portion thereof overlaps another portion, wrapping an elongated member (132) helically around the mandrel (120), heating the material (134) and the member (132) to a predetermined temperature and time wherein the at least one portion will adhere to the other portion and form a conduit (80). Thereafter, the conduit (80) can be removed from the mandrel (120).

17 Claims, 6 Drawing Sheets

LIGHTWEIGHT HOSE WITH A HELICALLY-WOUND REINFORCING MEMBER AND METHOD FOR MAKING THE SAME

CROSS-REFERENCE TO RELATED APPLICATIONS

This application is a continuation of PCT Patent Application Ser. No. PCT/US97/00232, filed Jan. 2, 1997 which claims priority on U.S. patent application Ser. No. 60/009,556, filed Jan. 3, 1996.

BACKGROUND OF THE INVENTION

1. Field of the Invention

This invention relates to a lightweight hose, and more specifically, to a hose constructed from a lightweight material and having a reinforcing material formed therein. In addition, the invention also relates to a method for forming a hose according to the invention.

2. Description of the Related Art

It is known to employ a hose to provide a conduit through which fluids under various degrees of pressure can flow. Typically, the hose is connected at one end to a source of the fluid, and at an opposite end to a particular destination to which the fluid is to be delivered. In some vehicle applications, such as in vehicle engines or vehicle air conditioning systems in the aircraft industry, the weight of all components, including any hoses, is critical and must be minimized without sacrificing the structural integrity thereof.

Hoses for lightweight applications are typically made of silicone, urethane and/or polyether sulphone. It has been known to provide such hoses with more than one layer, or "ply," to increase the structural stability of the hose. However, these hoses typically require additional plies to be adhesively bonded to one another or vulcanized to ensure that the plies of the hose are securely mounted together. The manufacturing process is labor intensive and costly. Also, multiple plies of the above materials tend to add significant weight to hoses which, in turn, add weight to the system in which the hoses are installed.

It is known to manufacture lightweight hoses on a mandrel of finite length. A first ply of material is wrapped around the mandrel and then additional plies are added, usually with an adhesive between adjacent plies. The hose is then typically vulcanized to complete the process. Currently, hoses are typically of a relatively short finite length, limited by the longitudinal length of the mandrel. In addition, these hoses are relatively heavy and can require several plies of material and/or relatively thick plies of material to ensure their structural integrity.

SUMMARY OF THE INVENTION

The hose disclosed herein overcomes the limitations of the prior art in the nature of its lightweight tubular wall having a helical reinforcing member contained therein. The hose can be made either by a process on a finite-length mandrel or by a continuous process wherein a substantially longer length of hose can be manufactured. Further, various embodiments of end cuffs and connectors for the hose disclosed herein are provided which include threads having a substantially equal pitch as the helical reinforcing member.

In one aspect of the invention, a lightweight conduit is characterized by a tubular wall formed of at least one ply of heat seamable material and at least one helical member whereby the ply is bonded to itself and to the reinforcing member without additional adhesive.

The heat seamable material is preferably reinforced in the warp and fill directions. In addition, the tubular wall is preferably formed of an inner ply and an outer ply whereby the helical member is disposed between the inner ply and the outer ply. In another aspect of the invention, a helical ridge is formed in the tubular wall in alternating pitch with the helical member. Additional helical members are optionally provided in the tubular wall whereby the additional helical members are disposed in alternating pitch with respect to the first helical member. The helical members are preferably formed of a corrosion-resistant and flame-retardant material such as a resin-impregnated fabric and/or a rigid polymer. The plies are typically overlapped with the helical member disposed within the overlapping portions.

In another aspect of the invention, the tubular wall forms a cuff adapted to be mounted at a first end and a second end to first and second conduits. The first end of the cuff is provided with an annular groove which receives a conventional press-fit connector. The second end of the cuff has an interior surface which is provided with threads adapted to receive a threaded connector. The second end of the cuff also has an exterior surface which is provided with threads adapted to receive a threaded connector.

In an additional aspect of the invention, the tubular wall forms a conduit having at least three ports. Optionally, the tubular wall is formed into connectors of various shapes including, but not limited to, a T-shaped or a Y-shaped connector.

In a further aspect of the invention, a combination of a lightweight conduit and a cuff and/or a connector is characterized by the conduit having a tubular wall with an outer surface and a first and a second end and the cuff having a tubular wall and a first and a second end. The outer surface of the conduit has a helical protrusion which defines a predetermined pitch and either the first or second end has an interior surface provided with threads defining a predetermined pitch substantially equal to the pitch of the helical protrusion on the conduit.

The invention also relates to a method for forming a lightweight, conduit, including but not limited to, the described embodiments. The method is characterized by the steps of providing a mandrel, wrapping at least one ply of heat seamable material around the mandrel so that at least one portion overlaps another portion, wrapping an elongated member helically around the mandrel, heating the material and the member to a predetermined bonding temperature for a predetermined period of time wherein the overlapping portions will adhere to one another forming a conduit, and removing the conduit from the mandrel.

The method in one aspect includes the step of providing a helical groove in the mandrel. Alternatively, the method is characterized by the step of providing a helical protrusion on the mandrel prior to the step of wrapping at least one ply of a heat seamable material around the mandrel. In yet another variation, one ply of heat seamable material is wrapped around the mandrel so that overlapping portions of each successive wrap of material are provided. Preferably, the elongated member is within the overlapping portions of the material, and wrapped helically between them. Optionally, the method further comprises the step of wrapping a second elongated member helically around the mandrel. The elongated members are formed from materials including, but not limited to, a resin-impregnated fabric or a rigid polymer.

In another aspect of the invention, the method is automated by providing a first feedable supply of the heat seamable material, providing a second feedable supply of the elongated member, providing a drive mechanism operably connected with the first feedable supply and the second feedable supply, and operating the drive mechanism to supply the mandrel with heat seamable material from the first feedable supply and the elongated member from the second feedable supply. This method farther comprises the steps of providing a nozzle adjacent the mandrel, and dispensing heated fluid from the nozzle as the material is wrapped around the mandrel.

BRIEF DESCRIPTION OF THE DRAWINGS

The invention will now be described with reference to the drawings in which.

DETAILED DESCRIPTION OF THE PREFERRED EMBODIMENTS

Figure 1:
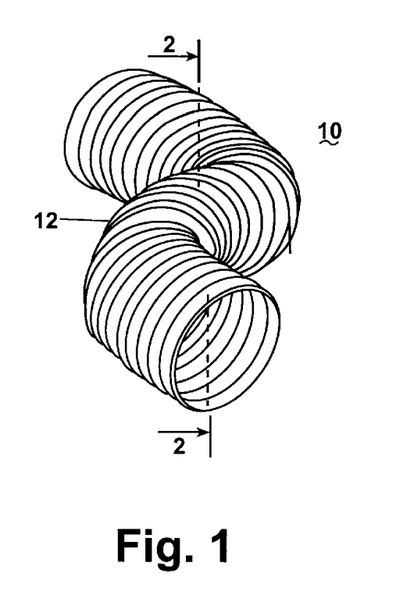
FIG. 1 is a perspective view of a first embodiment of a lightweight hose according to the invention.
Figure 2:
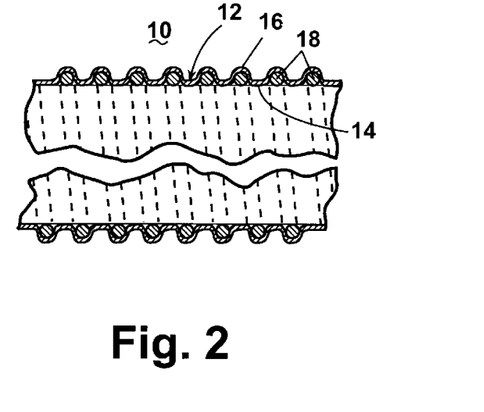
FIG. 2 is a cross-sectional view of the hose taken along lines 2—2 of FIG. 1.

Referring now to the drawings and to FIGS. 1–2 in particular, a length of a first embodiment of a lightweight hose 10 is shown comprising a tubular wall 12 having at least an inner ply 14 and an outer ply 16. The tubular wall 12 is reinforced by a helical member 18. The helical member 18 maintains the integrity of a transverse cross-section of the tubular wall 12 by allowing gathering between adjacent pitches of the helical member 18 during flexing of the hose 10. The helical member 18 is preferably formed of a metallic or polymeric material, such as nylon or stainless steel.

The inner and outer plies 14 and 16, respectively, are preferably formed from a lightweight, homogeneous, heat-seamable, polyester film, reinforced in the warp and fill directions. ORCOFILM® material, distributed by Orcon Corporation, 1570 Atlantic Street, Union City, Calif. 94587, and in particular, ORCOFILM® AN-47R and AN-49R compositions have been found to provide particularly desirable results in construction of lightweight hoses for airplane applications such as the embodiments described herein. The preferred material is humidity resistant so to remain moisture-proof in a combined humid environment. In addition, ORCOFILM® provides a lightweight reinforcement to hoses, has been found to resist tears, and provides a weight savings which reduces operating costs, a desirable feature in aircraft applications. Further, ORCOFILM® has been found to be sufficiently fire retardant, to be resistant to flame spread, and to tend to melt rather than ignite when encountering very high temperatures. In some of the embodiments described herein, the material has been found to have exceptional self-supporting characteristics when bonded to itself so that pre-defined shapes such as threads of a desired pitch can be maintained in conjunction with a reinforcing member.

Figure 3:
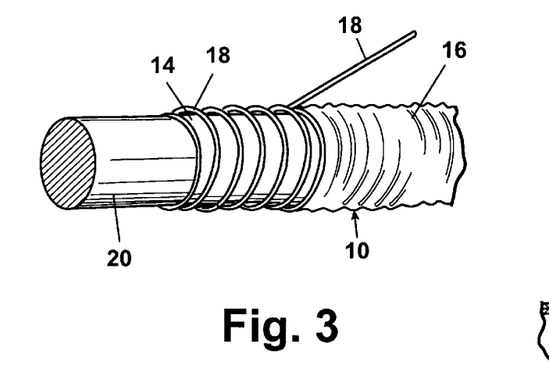
FIG. 3 is a perspective view of the hose of FIGS. 1–2 being formed on a mandrel.

FIG. 3 shows a preferred method of manufacture of the hose 10. A generally cylindrical mandrel 20 is shown, having a predetermined external diameter and extending at least as long as the desired length of the hose 10. The inner ply 14 is wrapped around the mandrel and held securely in place in a manner well known in the art. The reinforcing member 18 is then helically wound around the mandrel 20 and overlaps the inner ply 14. The outer ply 16 is laid over the helical member 18 in the same manner as the inner ply 14 so that the member 18 is sandwiched between the inner and outer plies 14 and 16. It will be understood that any number of plies can be used to further reinforce the tubular wall 12 of the hose 10 on either the inner or outer side of the helical member 18. It will be further understood that the plies of material can either be sleeved-wrapped or spirally-wrapped on the mandrel 20. When the last of the plies, namely outer ply 16, has been so laid, the entire structure is mechanically held, such as by a pressure wrap of nylon tape, and bonded at a particular temperature for a particular time preselected according to the particular ply material employed in the tubular wall 12 thereof. After bonding, the mechanical restraints are removed, the hose 10 is removed from the mandrel 20, and the hose 10 is ready for use.

The internal diameter of a hose 10 so constructed will preferably be in the range of 0.5 inches to 12 inches, although excellent strength and flexibility characteristics can be achieved with internal diameters of approximately 0.375 inches to 18 inches. This hose manufacturing method does not require the addition of any adhesive material between adjacent plies, due to the heat-seamable nature of the ply material. It will be understood that fewer plies of the preferred material allow the hose to flex increasingly well at smaller diameters. It will be further understood that the pitch and diameter of the helical member 18 determine the bending characteristics and radius of curvature during bending of the hose 10.

Figure 4:
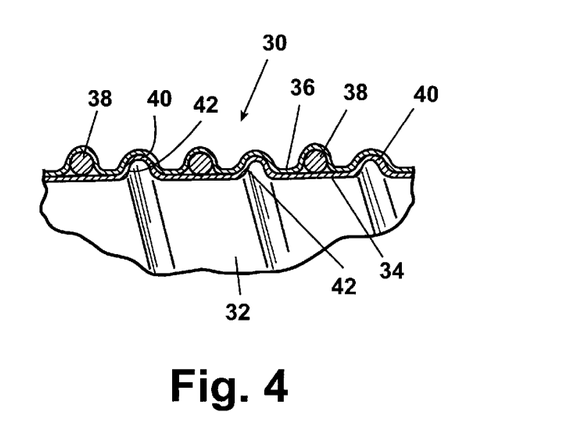
FIG. 4 is a fragmentary, longitudinal cross-sectional view of a second embodiment of a lightweight hose according to the invention.

FIG. 4 shows a second embodiment of a lightweight hose 30 which comprises a tubular wall 32 having at least an inner ply 34 and an outer ply 36. As in the first embodiment, the tubular wall 32 is reinforced by a helical member 38. The helical member 38 maintains the integrity of a transverse cross-section of the tubular wall 32 by allowing gathering between adjacent pitches of the helical member 38 during flexing of the hose 10. The hose 30 is also provided with a helical ridge 40 which is wound adjacent the helical member 38 so that the helical ridge 40 is located in alternating pitch with the helical member 38. The helical ridge 40 also includes an interior surface 42 which defines a helical surface in an interior wall of the hose 30. The helical ridge 40 allows greater flex of the hose 30 by allowing bending about a small radius of curvature and flex in both the longitudinal and tangential directions.

Figure 5:
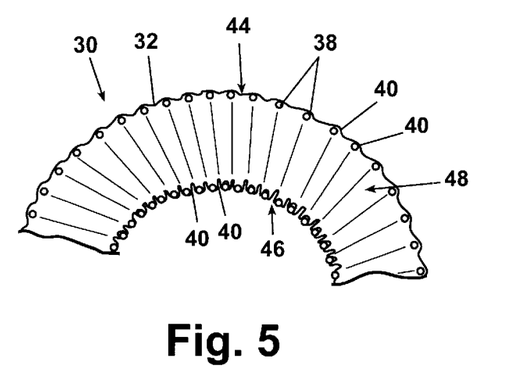
FIG. 5 is a diagrammatical view showing a bending characteristic of the hose of FIG. 4.

FIG. 5 shows the hose 30 in a bent position. An outer portion 44 of the hose 30 is shown wherein the helical ridge 40 is stretched due to the large radius of curvature of the hose 30. An inner portion 46 of the hose 30 is also shown wherein the helical ridge 40 is compressed due to the smaller radius of curvature of the hose 30. The helical ridge 40 thereby allows greater flexing of the hose 30 during bending and prevents the material of the tubular wall 32 from bunching up and extending into an interior conduit 48 of the hose 30 and causing a "fluttering" effect during high-velocity flow through the hose 30. Rather, the flexing of the helical ridge 40 allows the interior conduit 48 of the hose 30 to remain relatively smooth-bored and prevent this fluttering effect.

Figure 6:
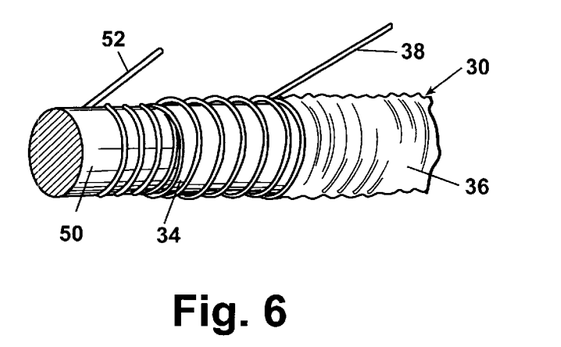
FIG. 6 is a perspective view of the hose of FIGS. 4–5 being formed on a mandrel.
Figure 7:
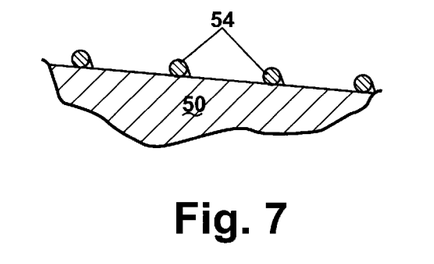
FIG. 7 is a cross-sectional view of an alternative embodiment of the mandrel of FIG. 6.

FIG. 6 shows a preferred method of manufacture of the hose 30 which is similar to the method shown for the first embodiment of the hose in FIG. 3. A generally cylindrical mandrel 50 is shown, having a predetermined external diameter and extending at least as long as the desired length of the hose 30. A helical core 52, such as a metallic or polymeric wire, can be wound around the mandrel 50 prior to a first ply of material to define the helical ridge 40, as shown in FIG. 4. Alternatively, and as seen in FIG. 7, the mandrel 50 can be provided with a helical protrusion 54 for defining the helical ridge 40.

Next, the inner ply 34 is wrapped around the mandrel 50 and the helical core 52 and held securely in place in a manner well known in the art. The reinforcing member 38 is then helically wound around the mandrel 50 and overlaps the inner ply 34. The outer ply 36 is laid over the helical member 38 in the same manner as the inner ply 34 so that the member 38 is sandwiched therebetween. When the last of the plies, namely outer ply 36, has been so laid, the entire structure is mechanically held and bonded. After bonding, the mechanical restraints are removed and the hose 30 is removed from the mandrel 50. The helical core 52 is removed from the hose 30, thus leaving the helical ridge defined on the hose 30.

Figure 8:
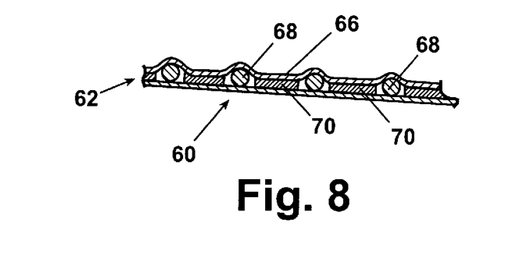
FIG. 8 is a cross-sectional view of a third embodiment of a lightweight hose according to the invention.

FIG. 8 shows a fragmentary, cross-sectional view of a third embodiment of a lightweight hose 60 which comprises a tubular wall 62 having at least an inner ply 64 and an outer ply 66. The third embodiment of the hose 60 has more than one helical reinforcing member, unlike the previous two embodiments. The tubular wall 62 is reinforced by a first helical member 68 and a second helical member 70. The first helical member 68 is similar in construction to the helical members in the previous two embodiments. The second helical member 70 is wound adjacent the first helical member 68 so that the second helical member 70 is located in alternating pitch with the first helical member 68. The second helical member 70 is provided for additional reinforcement to the tubular wall 62 and is formed from a lightweight, strong material including, but not limited to, fiberglass, a resin-impregnated fabric, Nomex and a rigid polymer. Because the hose 60 has additional reinforcing members, the hose 60 has greater longitudinal rigidity than the previous embodiments, has greater structural integrity, and can withstand greater external pressures.

Figure 9:
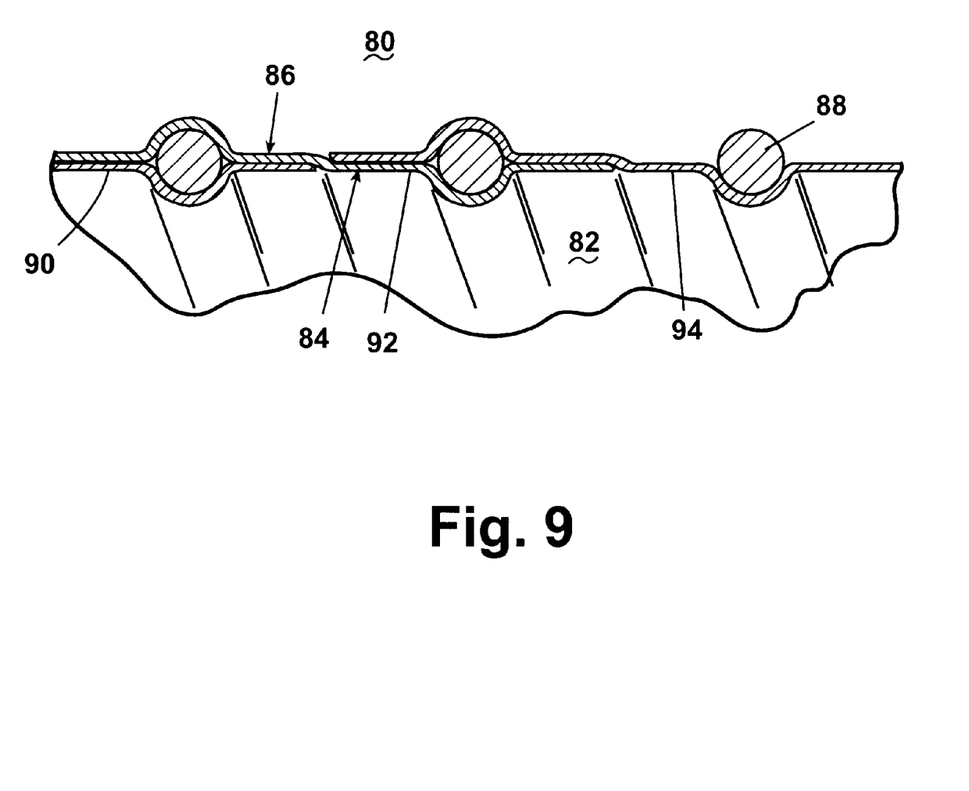
FIG. 9 is a cross-sectional view of a fourth embodiment of a lightweight hose according to the invention.

FIG. 9 shows a fragmentary, cross-sectional view of a fourth embodiment of a lightweight hose 80 which comprises a tubular wall 82 having at least an inner ply 84 and an outer ply 86. The tubular wall 82 is reinforced by a helical member 88. The inner and outer plies 84 and 86 are formed by successive helically-oriented wraps of the ply material. For example, as shown in FIG. 9, a portion of the hose 80 is shown having inner and outer plies 84 and 86 formed by first wrap 90, second wrap 92 and third wrap 94. It will be understood that a portion of each wrap forms an outer ply 86 and covers a single pitch of the helical member 88 and a remaining portion of each wrap forms an inner ply 84 for the next successive wrap of the ply material.

Figure 10:
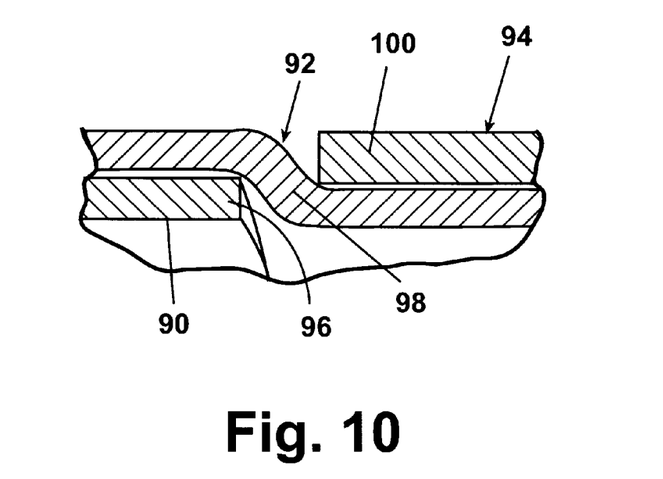
FIG. 10 is an enlarged portion of FIG. 9 showing an overlapping region of successive wraps of a material forming the hose of FIG. 9.

FIG. 10 shows a magnified portion of FIG. 9 illustrating the interaction between the first, second and third wraps 90, 92 and 94. It will be understood that the first wrap 90 has a leading edge 96 which is located adjacent a central portion 98 of the second wrap 92. In addition, the third wrap 94 has a trailing edge 100 which is also located adjacent the central portion 98 of the second wrap 92. This arrangement forms a basic two-ply structure similar to that shown in FIGS. 1–2.

Figure 11:
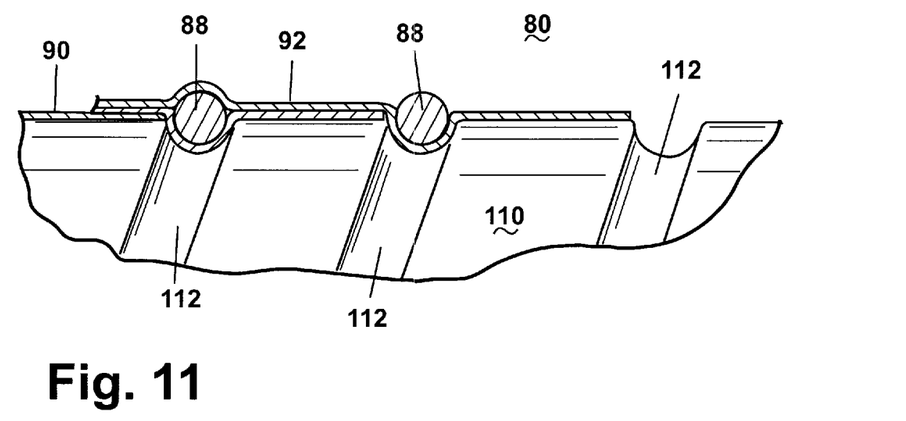
FIG. 11 is a cross-sectional view of a portion of the hose of FIGS. 9–10 on a side elevational view of a mandrel.

FIG. 11 shows a method of manufacture of the hose 80 illustrating the helical wrapping method discussed above. A generally cylindrical mandrel 110 is shown, having a predetermined external diameter and extending at least as long as the desired length of the hose 80. The mandrel 110 can be provided with a helical groove, shown generally at 112, adapted to receive the helical member 88 therein. A helical core (not shown), such as a metallic or polymeric wire, can be wound around the mandrel 110 prior to a first ply of material to define a helical ridge, as shown in FIG. 4. Alternatively, and as seen in FIG. 7, the mandrel can be provided with a helical protrusion (not shown) for defining a helical ridge for forming a hose with greater flexing characteristics.

The mandrel 110 is first wrapped with a first wrap 90 of the ply material around a single circumference of the mandrel. This first wrap 90 preferably covers a first pitch of the helical groove 112. Next, a length of the reinforcing member 88 is laid in the first pitch of the helical groove 112 covered by the first wrap 90. The mandrel 110 is then covered by a second wrap 92 of the ply material. A portion of the second wrap 92 covers the length of the reinforcing member 88 in the first pitch of the helical groove 112 and a next successive pitch of the helical groove 112. An additional length of the reinforcing member 88 is laid in the next successive pitch of the helical groove 112. This process repeats for the length of the mandrel 110. When the last of the ply material has been wrapped in this fashion over the length of the mandrel 110, the entire structure is mechanically held and bonded as in the previous methods discussed herein. After bonding, the mechanical restraints are removed and the hose 80 is removed from the mandrel 110.

Figure 12:
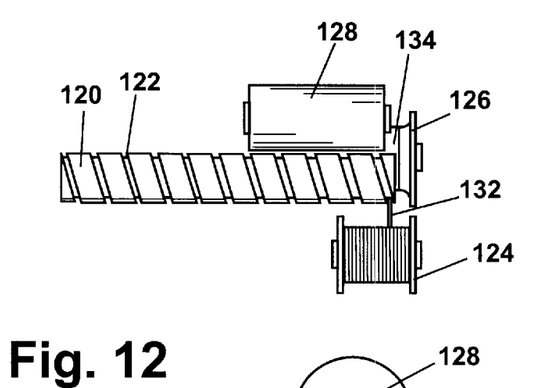
FIG. 12 is a side diagrammatical view of a continuous forming process for the hose of FIGS. 9–10.
Figure 13:
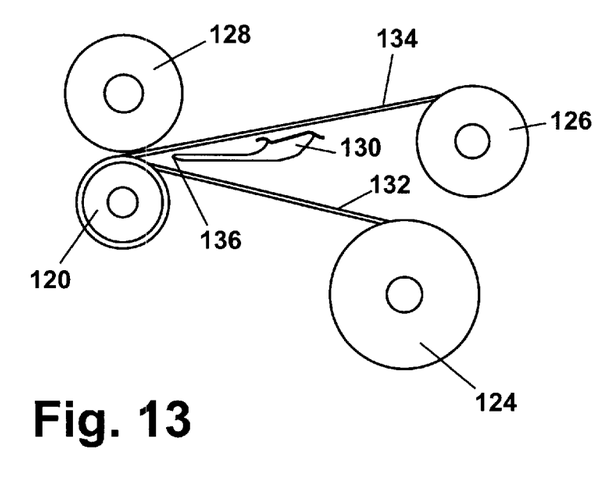
FIG. 13 is an end view of the process of FIG. 12.

FIGS. 12–13 show an alternative method of manufacture of a lightweight hose. In the previous methods discussed, a mandrel of finite length is wrapped and then cured. The method of FIGS. 12–13 is a continuous method of manufacturing a hose wherein a short length of the hose is wrapped and cured in quick succession and then advanced so that a successive length of the hose can be formed. The continuous method described herein can form a hose of much greater length that a mandrel-type process because the length of the hose is not limited by the length of the mandrel.

As shown in FIGS. 12–13, a mandrel 120 is shown having a helical groove 122. First spool 124 and second spool 126 are located adjacent the mandrel 120 as well as a drive wheel 128 and a nozzle 130. The first spool 124 contains a length of a reinforcing material 132, such as the reinforcing wire member of previous embodiments described herein. The second spool 126 contains a length of a ply material 134, such as the heat-seamable film of previous embodiments described herein. The drive wheel 128 is located immediately adjacent the mandrel 120 and is designed to drive the materials 132 and 134 from the spools 124 and 126 along the mandrel 120. The nozzle 130 has an exit port 136 located adjacent a point between the drive wheel 128 and the mandrel 120 and is preferably disposed between the incoming reinforcing material 132 and ply material 134. The nozzle 130 is fluidly interconnected to a source of heated pressurized air so that fluid dispensed from the exit port 136 is directed at the material on the mandrel 120.

The ply material 134 on the second spool 126 is fed onto the mandrel 120. The ply material 134 is driven around the mandrel 120 by the drive wheel 128. After a first length of the ply material 134 has been driven around a circumference of the mandrel 120 and covers a first pitch of the helical groove 122, a length of the reinforcing material 132 is fed from the first spool 124 into the helical groove 122. The ply material 134 is continually fed so that successive wraps of the ply material 134 overlap—a portion of each wrap covers the previously-laid length of the reinforcing material 132 in the helical groove 122 and the remaining portion of each wrap covers a successive pitch of the helical groove 122 to receive the next length of the reinforcing material 132. Heated, pressurized fluid is continually directed from the nozzle 130 at the recently-laid ply material 134 so that the ply material 134 is continually bonded.

The continuous wraps of the ply material 134 and the reinforcing material 132 form a hose of a structure similar to that shown in FIGS. 9–11. The hose cools as it travels along the length of the mandrel 120. It will be understood that the length of the hose can be accumulated as it travels off the end of the mandrel. It will be also understood that the mandrel 120 can be formed with a helical protrusion or pre-wrapped with a helical core to form a helical ridge in the hose to increase the bending characteristics of the hose. The helical ridge allows additional flexing of the hose by preventing inward folds of the hose material during bending. Additional plies of the ply material can be provided by providing additional spools of the ply material to create a stiffer hose which is desirable at larger diameters to prevent collapse of the hose during use. The nozzle 130 heat seams the ply material 134 so that the reinforcing material 132 is contained in a pocket formed by successive overlapping windings of the ply material 134. It will be further understood that the mandrel 120 need not be provided with the helical groove 122 so that a hose having a smooth interior bore can be manufactured thereon.

Figure 14:
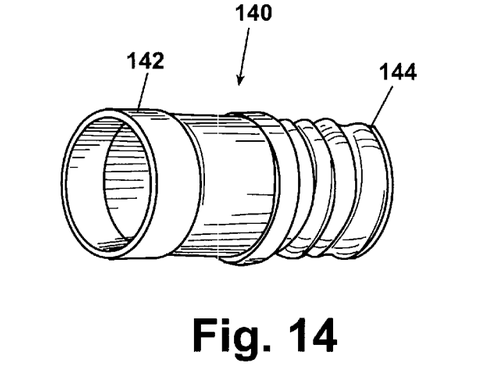
FIG. 14 is a perspective view of a cuff for attachment to an end of any of the embodiments of the hose according to the invention.
Figure 15:
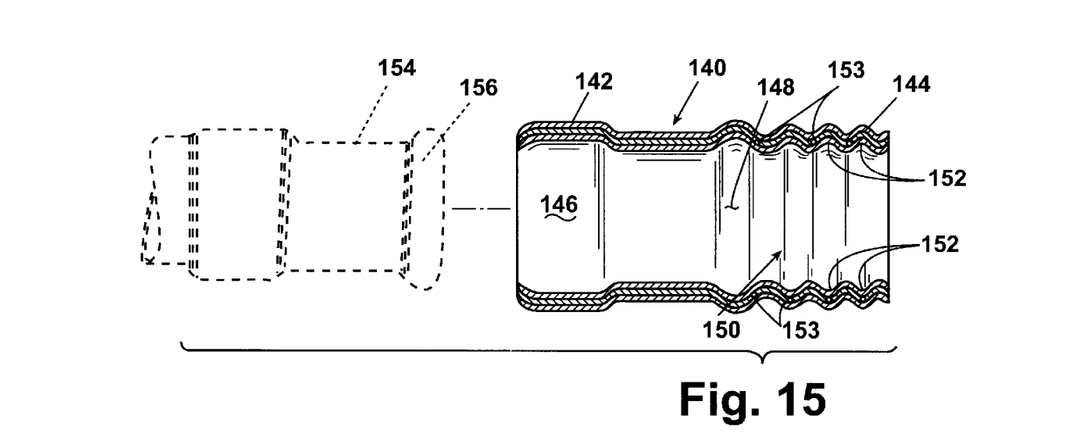
FIG. 15 is a cross-sectional view of the cuff of FIG. 14 and a corresponding conventional conduit for attachment at one end.
Figure 16:
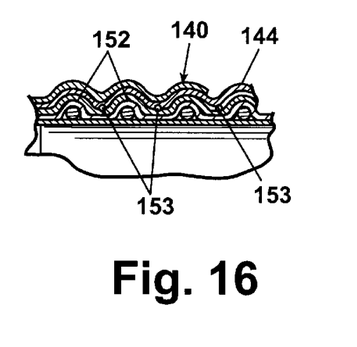
FIG. 16 is a fragmentary, cross-sectional view of the cuff of FIG. 14 showing the attachment of the cuff to a lightweight hose according to the invention.

FIGS. 14–16 show a connector, shown as an end cuff 140, having a first end 142 and a second end 144 adapted to mount a conventional hose and a hose assembly described herein, respectively. The first end 142 of the end cuff 140 comprises a cylindrical socket 146 and an optional annular groove 148 at an interior portion thereof. The second end of the end cuff 140 comprises a cylindrical socket 150 which is provided with internal threads 152 preferably formed by a helical member 153, preferably configured with a similar pitch of the helical reinforcing member of any of the hose embodiments described herein. Alternatively, the helical member 153 can be located adjacent or on an external surface of the cuff 140 so that the cuff can be threaded onto a conduit having internal threads thereon.

As shown in FIG. 15, the first end 142 can be interconnected with a conventional fluid delivery conduit, shown generally at 154, having an annular bead 156 at an axial end thereof. The conduit 154 can be mounted to the cuff 140 by either press-fitting the conduit 154 into the first end 142 of the cuff 140 so that the annular bead 156 is located within the annular groove 148 of the cuff 140 or by mounting a conventional hose clamp around the first end 142 of the cuff 140 while the conduit 154 is located therein.

As shown in FIG. 16, the second end 144 of the cuff 140 is adapted to threadingly receive a hose having a helical thread on an exterior surface thereof. It will be understood that the hose structures described herein have a helical protrusion formed by the helical reinforcing member mounted between plies in the hose assembly. A hose can be mounted to the second end 144 of the cuff 140 by threading the helical protrusion on the hose within the threads 152 on the interior portion of the second end 144.

Figure 17:
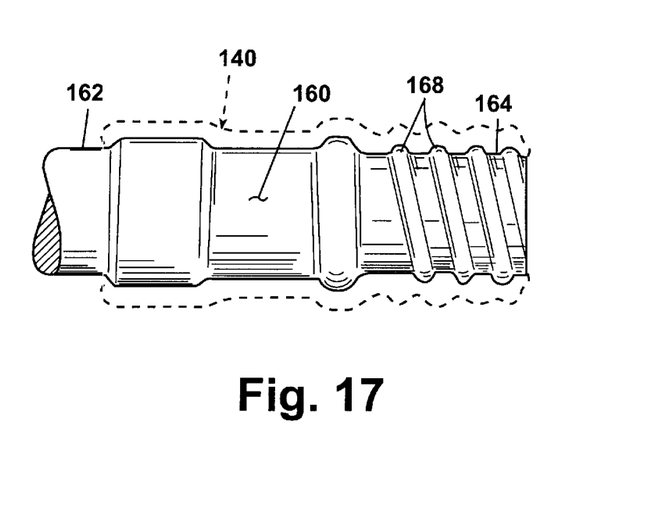
FIG. 17 is a longitudinal cross-sectional view of a mandrel for forming the cuff of FIG. 14.

FIG. 17 shows a mandrel 160 adapted to form a cuff similar to that shown in FIGS. 14–16. The mandrel 160 is a generally cylindrical member having a first end 162 and a second end 164. The first end 162 of the mandrel 160 can be shaped in any particular manner to conform to an interior portion of a conventional hose conduit such as the conduit 154 shown in FIG. 15. The second end 164 of the mandrel 160 is provided with a helical protrusion 168 which corresponds in pitch to a helical protrusion on a hose assembly, such as the embodiments of the hose structures described herein.

To manufacture the cuff 140 of FIGS. 14–16, a helical protrusion 168 can be provided on the mandrel 160 of FIG. 17. One or more layers of heat seamable material and elastomer-impregnated fabric can be wound around the mandrel 160 and the helical protrusion 168 and bonded. In addition, a helical member, such as that shown at 153 in FIGS. 15–16, can be wrapped around a portion of the mandrel 160 at a desired pitch, preferably in alternating pitch with the helical protrusion 168 thereon, to form threads. Then, the formed cuff, shown as 140 in FIG. 17, can be removed from the mandrel 160. The cuff 140 can be formed from a heat seamable material, silicone, urethane or any other suitable material. A layer of film can be vulcanized to the cuff 140 to provide a compatible material if the cuff is to be bonded to a hose structure made from a heat seamable material as described herein.

Figure 18:
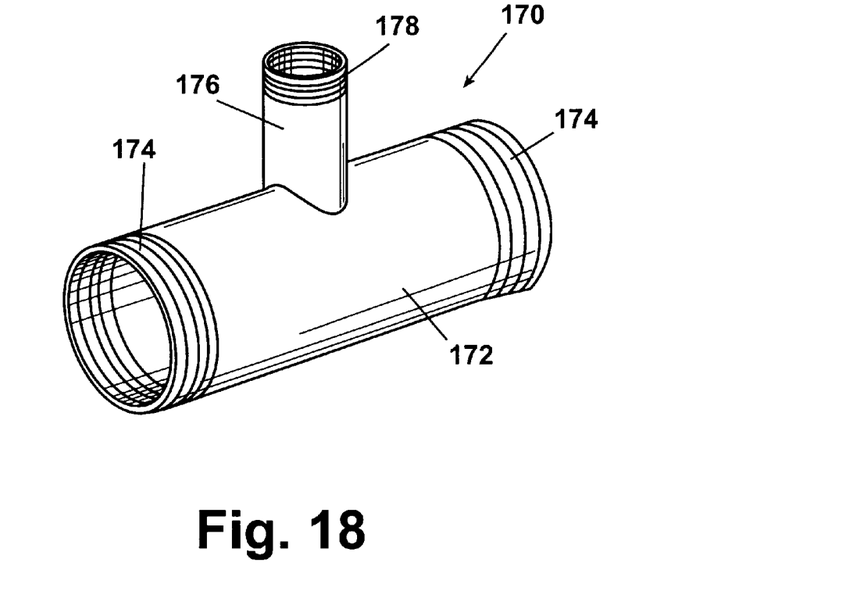
FIG. 18 is a perspective view of a T-shaped connector for two or more hoses.
Figure 19:
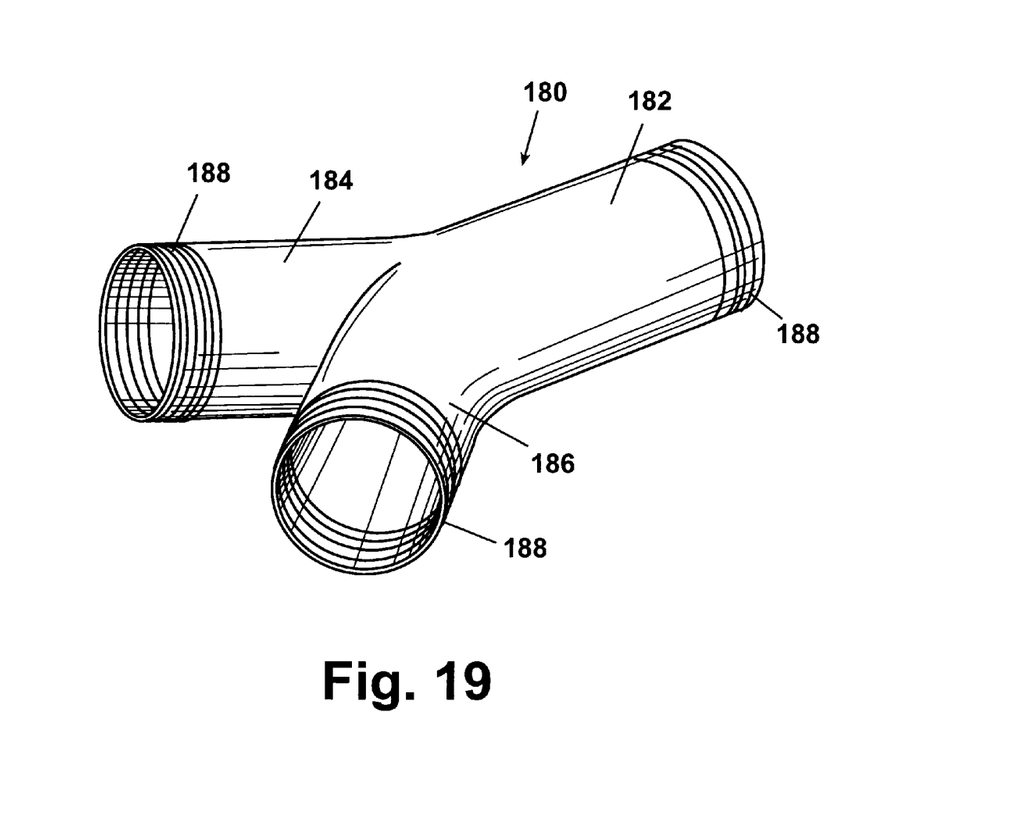
FIG. 19 is a perspective view of a Y-shaped connector for two or more hoses.

FIGS. 18–19 show a T-connector 170 and a Y-connector 180, respectively. In FIG. 18, the T-connector 170 comprises a cylindrical body 172 having interior and/or exterior screw threads 174 at each end and further including an upwardly-extending cylindrical shell 176 having interior and/or exterior screw threads 178 at a distal end thereof. In FIG. 9, the Y-connector 180 comprises a cylindrical body 182 which forks at one end into first and second cylindrical paths 184 and 186. The outer ends of the cylindrical body 182 and the cylindrical paths 184 and 186, each are provided with external and/or internal screw threads 188. The screw threads on the T-connector 170 and the Y-connector 180 can be formed by an impregnated helical reinforcing member, as described herein, and are adapted to receive screw threads on a cuff 140 or to be threaded directly onto any of the hoses described herein or any suitable hose known in the prior art. The T-connector 170 and Y-connector 180 are used for interconnecting two or more hoses such as to divide a single flow path into a pair of branch flow paths or to converge a pair of flow paths into a single flow path.

To make either connector 170 or 180, a shaped mandrel (not shown) in the desired "T" or "Y" shaped is wrapped with a number of plies of material, preferably from one to eight, and encompassed by mechanical restraints. The wrapped mandrel is then bonded at a preselected temperature and time depending upon the particular material used for the connector 170, 180. The mandrel can include screw thread formations on its surface which form screw threads on the connector. The wrapped mandrel is then cooled until the mechanical restraints can be removed. The connector 170 or 180 is then removed from the mandrel and is ready for use.

It will be understood that the reinforcing member in the hose structures described herein can be formed from a deformable material which can be over-bent to define an elliptical, square, rounded, rectangular, or other desirable shape as required by a particular application.

It will be further understood that the cuffs and connectors described herein can be formed as a transition piece or coupler to interconnect hoses with differently-shaped cross-sectional profiles. The transition pieces can be made with films in conjunction with rubber or polymer coated or impregnated fabrics as required by a particular application. A specially-shaped mandrel can be used in conjunction with a wrapping process as described above to create such a transition piece. This process, as in the above-described processes, does not require adhesive to be disposed between adjacent plies of material. As before, helical threads can be defined on the transition pieces for attachment to other hoses and conduits.

Reasonable variation and modification are possible within the spirit of the foregoing specification and drawings without departing from the scope of the invention.

The embodiments for which an exclusive property or privilege is claimed are defined as follows:

1. A lightweight conduit characterized by:
   (a) a tubular wall formed of at least one wrapping of heat seamable material wherein the heat seamable material is reinforced in the warp and fill directions; and
   (b) at least one helical member;
   wherein the at least one wrapping is bonded to itself and mounts the at least one helical member without additional adhesive.

2. The conduit of claim 1 wherein:
   (a) the at least one wrapping forms an inner ply and an outer ply;
   (b) the helical member is disposed between the inner ply and the outer ply.

3. The conduit of claim 1 and further comprising a helical ridge formed in the tubular wall in alternating pitch with the helical member.

4. The conduit of claim 1 wherein the at least one helical member comprises a first helical member and a second helical member formed in the tubular wall whereby the second helical member is disposed in alternating pitch with respect to the first helical member.

5. The conduit of claim 4 wherein one of the first and second helical members is formed of a corrosion-resistant and flame-retardant material.

6. The conduit of claim 4 wherein one of the first and second helical members is formed of a resin-impregnated fabric material.

7. The conduit of claim 4 wherein one of the first and second helical members is formed of a rigid polymer material.

8. The conduit of claim 1 wherein the at least one helical member is formed of a corrosion-resistant and flame-retardant material.

9. The conduit of claim 1 wherein the at least one helical member is formed of a rigid polymer material.

10. The conduit of claim 1 wherein the at least one ply is provided with overlapping portions and the at least one helical member is disposed within the overlapping portions.

11. The conduit of claim 1 wherein the tubular wall forms a cuff adapted to be mounted at a first end and a second end to first and second conduits.

12. The conduit of claim 11 wherein the first end of the cuff is provided with an annular groove which is adapted to receive a conventional press-fit connector.

13. The conduit of claim 11 wherein the second end of the cuff has an interior surface, the interior surface is provided with threads adapted to receive a threaded connector.

14. The conduit of claim 11 wherein the second end of the cuff has an exterior surface, the exterior surface is provided with threads adapted to receive a threaded connector.

15. The conduit of claim 1 wherein the tubular wall forms a conduit having at least three ports.

16. The conduit of claim 15 wherein the tubular wall forms a T-shaped connector.

17. The conduit of claim 15 wherein the tubular wall forms a Y-shaped connector.

* * * * *